(12) United States Patent
Cheng

(10) Patent No.: US 10,288,193 B2
(45) Date of Patent: May 14, 2019

(54) METHOD AND SYSTEM FOR FORMING A PIPELINE

(71) Applicant: Paul Po Cheng, London (CA)

(72) Inventor: Paul Po Cheng, London (CA)

(*) Notice: Subject to any disclaimer, the term of this patent is extended or adjusted under 35 U.S.C. 154(b) by 94 days.

(21) Appl. No.: 15/495,181

(22) Filed: Apr. 24, 2017

(65) Prior Publication Data
US 2018/0209563 A1    Jul. 26, 2018

Related U.S. Application Data

(60) Provisional application No. 62/450,153, filed on Jan. 25, 2017.

(51) Int. Cl.
| | |
|---|---|
| *F16L 1/036* | (2006.01) |
| *B29C 65/00* | (2006.01) |
| *E03F 3/06* | (2006.01) |
| *F16L 1/024* | (2006.01) |
| *F16L 1/038* | (2006.01) |
| *F16L 51/04* | (2006.01) |

(52) U.S. Cl.
CPC ............ *F16L 1/036* (2013.01); *B29C 65/00* (2013.01); *E03F 3/06* (2013.01); *F16L 1/0246* (2013.01); *F16L 1/038* (2013.01); *F16L 51/04* (2013.01)

(58) Field of Classification Search
CPC ...................................................... F16L 1/036
USPC ........................................................ 405/156
See application file for complete search history.

(56) References Cited

U.S. PATENT DOCUMENTS

| | | | |
|---|---|---|---|
| 3,744,259 A | 7/1973 | Wagley | |
| 3,900,146 A * | 8/1975 | Fowler | B23K 37/053 228/103 |
| 4,452,550 A * | 6/1984 | Hofmeester | F16L 1/032 405/158 |
| 4,555,053 A | 11/1985 | Persson et al. | |
| 4,558,971 A * | 12/1985 | David | F16L 1/038 156/175 |
| 4,936,707 A | 6/1990 | Shishkin et al. | |
| 5,145,282 A | 9/1992 | Payne | |
| 5,208,443 A | 5/1993 | McGaffigan | |
| 5,240,167 A | 8/1993 | Ferte et al. | |
| 5,699,955 A | 12/1997 | Shimizu et al. | |
| 5,831,252 A | 11/1998 | Shimizu | |
| 6,637,642 B1 | 10/2003 | Lingnau | |
| 6,830,412 B2 | 12/2004 | Perez | |
| 7,037,042 B2 | 5/2006 | Wilkinson | |

(Continued)

FOREIGN PATENT DOCUMENTS

| | | |
|---|---|---|
| CA | 266367 | 1/2013 |
| WO | WO97/32686 A1 | 9/1997 |

OTHER PUBLICATIONS

Machine-Generated English Language Translation of the Abstract of WO94/15445, Strikovsky et al, dated Jul. 21, 1994.

*Primary Examiner* — Tara Mayo-Pinnock

(57) ABSTRACT

A system for forming a pipeline including fused pipe having straight pipe elements and one or more non-linear pipe subassemblies positionable at respective preselected locations on a predetermined path. The system includes a straight pipe processing subassembly and a finishing subassembly. The system also includes a second fusing module for fusing the non-linear pipe subassembly with a selected one of the straight pipe elements to include the non-linear pipe subassembly in the fused pipe, the second fusing module being attachable to the finishing subassembly.

2 Claims, 13 Drawing Sheets

(56) References Cited

U.S. PATENT DOCUMENTS

| | | |
|---|---|---|
| 7,086,960 B2 | 8/2006 | Huang et al. |
| 7,261,493 B2 | 8/2007 | Wilkinson |
| 7,348,523 B2 | 3/2008 | Slack et al. |
| 7,475,915 B2 | 1/2009 | Cafaro |
| 7,607,863 B2 | 10/2009 | Paull |
| 7,726,909 B2 | 6/2010 | Miller et al. |
| 7,752,728 B2 | 7/2010 | Schedler et al. |
| 7,931,184 B2 | 4/2011 | Lingnau et al. |
| 8,151,453 B2 | 4/2012 | Garcia Tercero |
| 9,080,693 B2 | 7/2015 | Cheney et al. |
| 9,644,769 B1 | 5/2017 | Cheng |
| 2003/0039509 A1 | 2/2003 | McIvor |
| 2009/0256349 A1 | 10/2009 | Strubin et al. |
| 2010/0108666 A1 | 5/2010 | Gafri et al. |
| 2011/0284523 A1 | 11/2011 | Hiroyama et al. |
| 2016/0091113 A1 | 3/2016 | Weigand et al. |

\* cited by examiner

METHOD AND SYSTEM FOR FORMING A PIPELINE

CROSS-REFERENCE TO RELATED APPLICATION

This application claims the benefit of U.S. Provisional Patent Application No. 62/450,153, filed on Jan. 25, 2017, the entirety of which is hereby incorporated by reference.

FIELD OF THE INVENTION

The present invention is a method and a system for forming a pipeline that includes straight pipe elements and one or more non-linear pipe subassemblies.

BACKGROUND OF THE INVENTION

Pipelines are typically formed and laid in a series of steps that require frequent use of small cranes and side booms, to lift or to lower pipe. The steps are numerous, and time-consuming. Although the pipeline resulting is continuous, the conventional methods of forming and laying the pipeline involve a number of batch processes.

Typically, after the intended path of the pipeline has been located on the ground, a trench is dug at the site, for receiving the pipe. Next, individual pipes are transported to the site, and laid beside the trench. Subsequently, the pipes are picked up, joined into lengths using conventional welding techniques, and inspected. The lengths of welded pipe are coated and then picked up again, to be lowered into the trench. The lengths of welded pipe in the trench are tested, and then the welded pipe lengths are covered.

Where the ground conditions do not permit utilization of a trench (e.g., in a swampy region, or muskeg and tundra), the pipeline may instead be positioned on trestles or other suitable supports in which the pipe is securely held and supported. However, except for the differences in positioning the pipeline relative to the ground, the steps required to form the pipeline are generally the same.

The completed pipeline, although primarily including straight pipe, typically also includes a number of segments that are not straight, and/or include components such as valves that require special handling upon installation.

From the foregoing, it can be seen that the conventional method of forming a pipeline involves personnel with different expertise engaged in a large number of discrete steps, and is somewhat time-consuming as a result.

SUMMARY OF THE INVENTION

There is a need for a method and system for forming a pipeline that overcomes or mitigates one or more of the disadvantages or defects of the prior art. Such disadvantages or defects are not necessarily included in those described above.

In its broad aspect, the invention provides a system for forming a pipeline including fused pipe having straight pipe elements and one or more non-linear pipe subassemblies positionable at respective preselected locations on a predetermined path. The system includes a straight pipe processing subassembly including a loader module in which the straight pipe elements are loaded, and a first fusing module for fusing the straight pipe elements together to form the fused pipe. The system also includes a finishing subassembly having an inspection module in which the fused pipe is inspected, the inspection module being attachable to the first fusing module, and a finishing module in which coating is applied to the fused pipe to form finished pipe segments. In addition, the system includes a second fusing module for fusing the non-linear pipe subassembly with selected ones of the straight pipe elements to include the non-linear pipe subassembly in the fused pipe, the second fusing module being attachable to the inspection module.

In another aspect, the invention provides a method of forming a pipeline including fused pipe laid in an upstream direction along a predetermined path having one or more design elevations. The pipeline includes straight pipe elements and one or more non-linear pipe subassemblies positioned at respective preselected locations on the predetermined path. The method includes providing a loader module for loading the straight pipe elements, positioning a plurality of the straight pipe elements in the loader module, and providing a first fusing module connected to the loader module and configured for fusing the straight pipe elements together, the loader module and the first fusing module forming a straight pipe processing subassembly. With the first fusing module, the straight pipe elements are fused together in series to form a first portion of the fused pipe. In an inspection module attached to the first fusing module, the fused pipe is inspected. In a finishing module attached to the inspection module, coating is applied to the fused pipe, to form finished pipe segments, the inspection module and the finishing module forming a finishing subassembly. The straight pipe processing subassembly and the finishing subassembly are moved relative to the predetermined path in the upstream direction along the predetermined path to allow the finished pipe segments to be lowered to the design elevation along the predetermined path under the influence of gravity. Substantially at the preselected location, the first fusing module is detached from the inspection module. The straight pipe processing subassembly is moved in the upstream direction apart from the finishing subassembly, to provide a gap between the first fusing module and the inspection module substantially at the preselected location. One or more support elements are positioned in the gap. A second fusing module is moved into a predetermined position in the gap relative to the inspection module, and the second fusing module is attached with the inspection module, the second fusing module being at least partially supported by the support element. A downstream end of the non-linear pipe subassembly located in the second fusing module is fused to an upstream end of the first portion of the fused pipe supported by the inspection module, to provide a second portion of the fused pipe that includes the non-linear pipe subassembly. The second fusing module is moved in the upstream direction to position the non-linear pipe subassembly at least partially in the inspection module, in which the second portion of the fused pipe, including the non-linear pipe subassembly, is inspected. The second fusing module is moved in the upstream direction to position the non-linear pipe subassembly at least partially in the finishing module, in which a coating is applied to the non-linear pipe subassembly, to include the non-linear pipe subassembly in the finished pipe segments. The second fusing module is detached from the inspection module. The second fusing module is moved away from the predetermined path. The first fusing module is attached to the inspection module. A downstream end of a selected one of the straight pipe elements is fused with the upstream end of the non-linear pipe subassembly to include the non-linear pipe subassembly in the fused pipe. The straight pipe processing subassembly and the finishing subassembly are moved in the upstream direction along the predetermined path, to allow the finished pipe segment including the non-linear pipe subassembly to be positioned in the preselected location on the predetermined path.

In another of its aspects, the invention provides a non-linear pipe subassembly extending between first and second ends thereof, to be fused to respective straight pipe elements at the first and second ends. The non-linear pipe subassembly includes a non-linear pipe element extending between upstream and downstream ends thereof, a straight pipe element extending between upstream and downstream ends thereof, and an intermediate pipe element positioned between the downstream end of the straight pipe element and the upstream end of the non-linear pipe element. The intermediate pipe element is fused to the non-linear pipe element at its upstream end and fused to the straight pipe element at its downstream end.

BRIEF DESCRIPTION OF THE DRAWINGS

The invention will be better understood with reference to the attached drawings, in which.

DETAILED DESCRIPTION

Figure 1:
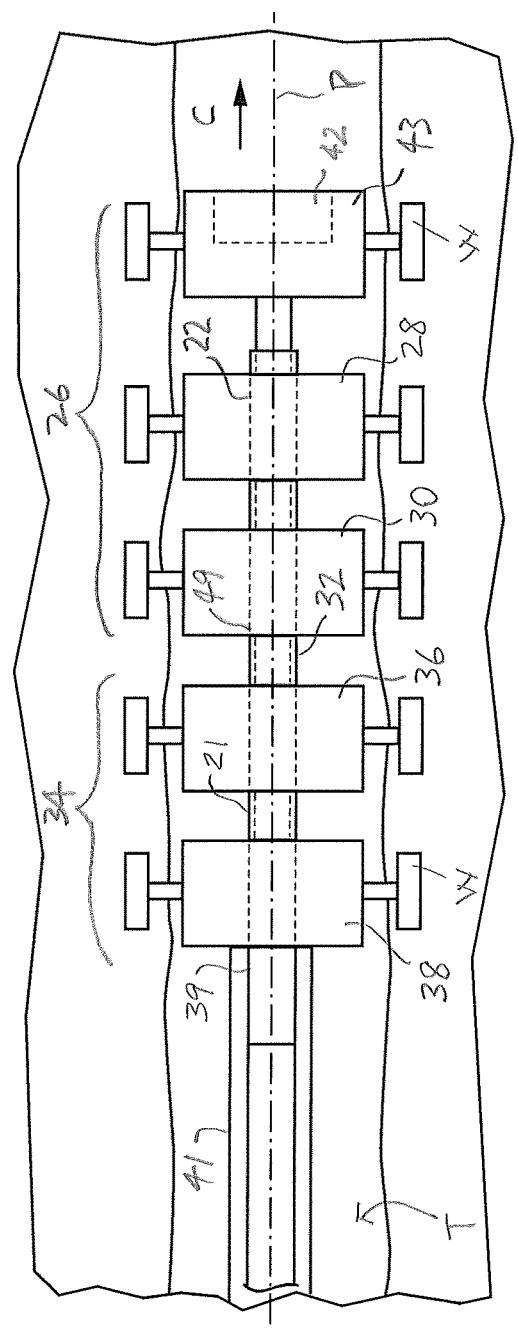
FIG. 1 is a top view of an embodiment of a system of the invention.

In the attached drawings, like reference numerals designate corresponding elements throughout. Reference is made to FIGS. 1-6 to describe an embodiment of a system in accordance with the invention indicated generally by the numeral 20 (FIG. 3D). The system 20 is for forming a pipeline "Q" (FIGS. 5, 6) including fused pipe 21 that preferably includes straight pipe elements 22 and one or more non-linear pipe subassemblies 24 (FIG. 3B) positionable at a preselected location "A" on a predetermined path "P" (FIG. 5), as will be described. In one embodiment, the system 20 preferably includes a straight pipe processing subassembly 26 that includes a loader module 28 in which the straight pipe elements 22 are loaded, and a first fusing module 30 for fusing the straight pipe elements 22 together end-to-end to form a plurality of straight pipe segments 32 (FIG. 1). As can be seen, for example, in FIGS. 1 and 3D, it is also preferred that the system 20 includes a finishing subassembly 34. In one embodiment, the finishing subassembly includes an inspection module 36 in which the fused pipe 21 is inspected, the inspection module 36 being attachable to the first fusing module 30, and a finishing module 38 in which coating is applied to the fused pipe 21 to form finished pipe segments 39. As will also be described, the system 20 preferably also includes a second fusing module 40 for fusing the non-linear pipe subassembly 24 with selected ones of the straight pipe segments 32, to include the non-linear pipe subassembly 24 in the fused pipe 21. The second fusing module 40 preferably is attachable to the inspection module 36.

Figure 4:
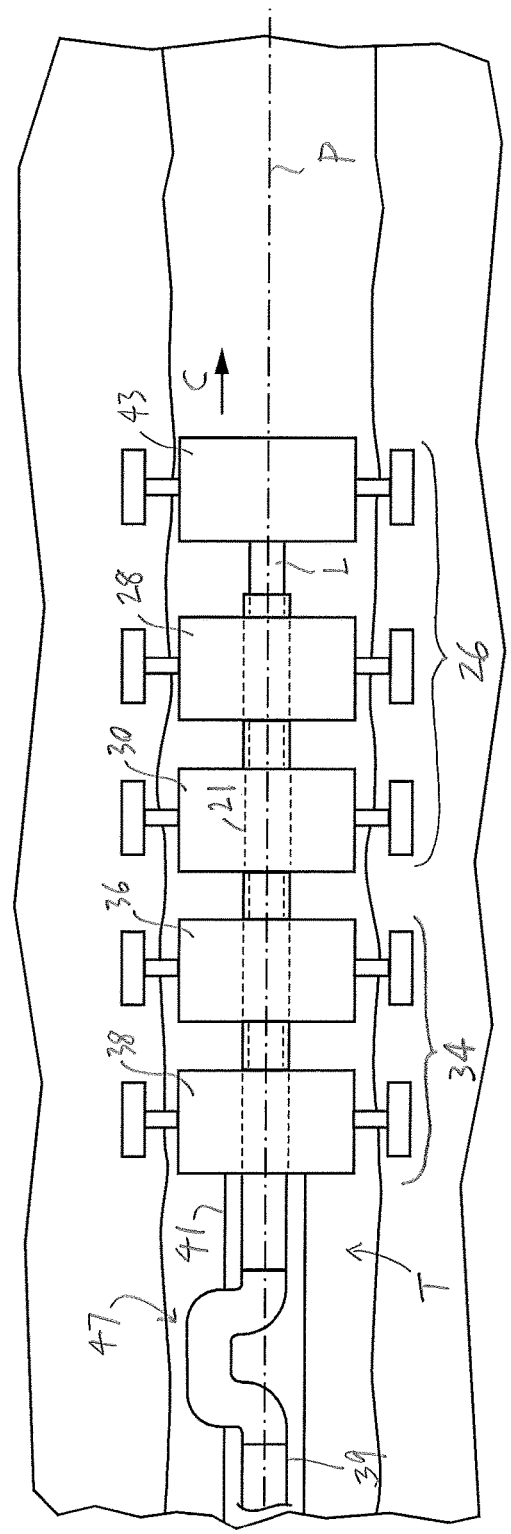
FIG. 4 is a top view of the system of FIG. 1 in which the straight pipe processing subassembly and the finishing subassembly are attached together, drawn at a smaller scale.

It will be understood that the pipe elements 22 are substantially straight. However, those skilled in the art would appreciate that the pipeline "Q" preferably includes one or more non-linear pipe elements 47 therein which may be one or more of various pipes and fittings that are not substantially straight (FIG. 4). For instance, the non-linear pipe elements 47 may include one or more of the following:
(a) an expansion joint;
(b) a valve;
(c) an inspection station; and
(d) a bend in the pipeline, e.g., to avoid an obstruction (in plan or elevation).

For the purposes hereof, it will be understood that, in the inspection module 36, the fused pipe 21 is inspected and, if necessary, the fused pipe 21 is also subjected to post-weld treatment(s). Accordingly, for the purposes hereof, it will be understood that a reference to the fused pipe being "inspected" in the inspection module 36 includes also providing such post-weld treatment as may appear necessary, in addition to inspection. Those skilled in the art would be aware of suitable means for inspecting and providing post-weld treatment.

Similarly, it will be understood that, in the finishing module 38, both coating and insulation may be added to the fused pipe 21, to result in the finished pipe segments 39. Accordingly, for the purposes hereof, it will be understood that a reference to the fused pipe being "coated" in the finishing module 38 includes also adding insulation to the fused pipe 21 as may be required, in addition to providing a coating, to provide the finished pipe segments 39. Those skilled in the art would be aware of suitable means for coating and insulating.

Figure 2:
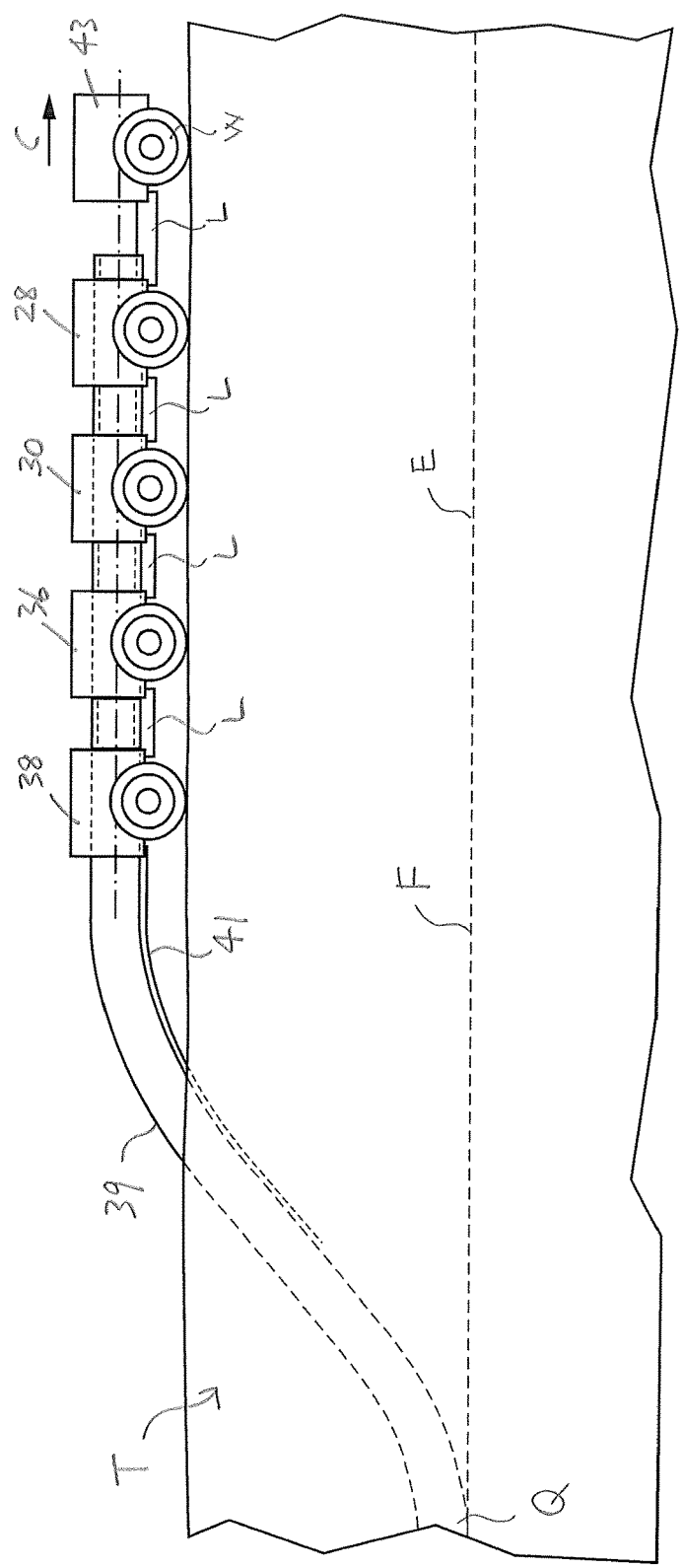
FIG. 2 is a side view of the system of FIG. 1.
Figure 3A:
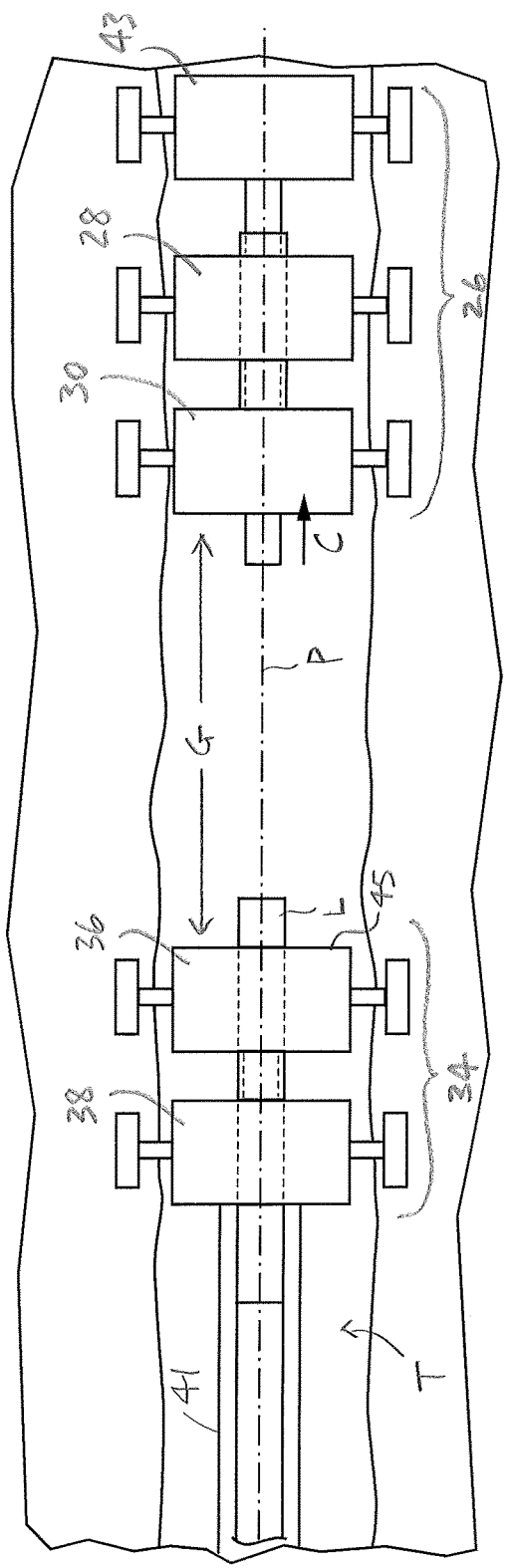
FIG. 3A is a top view of the system of FIG. 1 in which a straight pipe processing subassembly thereof and a finishing subassembly thereof are detached from each other.
Figure 5:
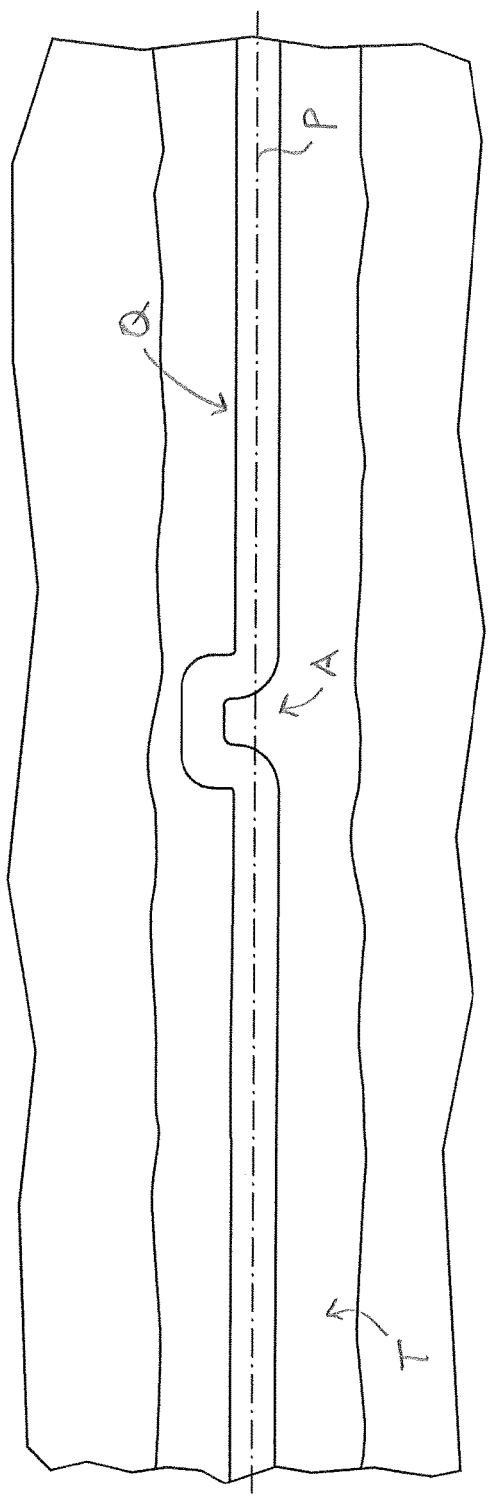
FIG. 5 is a top view of a portion of an embodiment of the pipeline of the invention as installed, drawn at a smaller scale.
Figure 6:
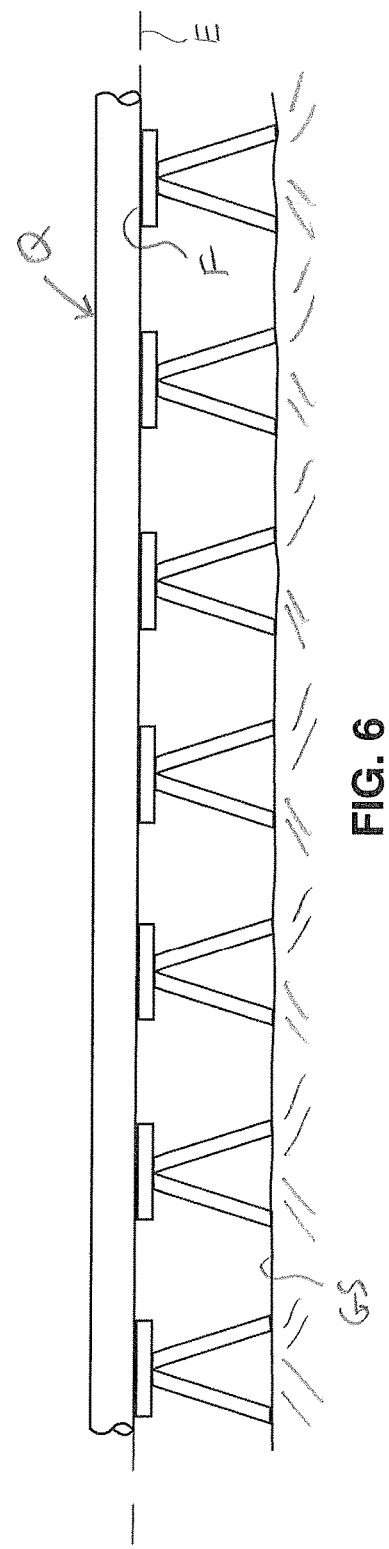
FIG. 6 is a side view of part of another embodiment of the pipeline of the invention as installed.

It will be understood that the finished pipe segments 39 are substantially stationary relative to the predetermined path "P", except that they are located above (i.e., aligned with) the design elevation when initially formed, i.e., immediately upon exiting the finishing module 38 (FIG. 2). As will be described, the system 20 preferably is movable relative to the predetermined path "P" in an upstream direction, to lay the finished pipe segments 39 on the predetermined path "P" at the design elevation, to form the pipeline "Q" (FIGS. 5, 6). The upstream direction is indicated by arrow "C" in FIGS. 1 and 2. It will be understood that the predetermined path "P" preferably is positioned at one or more design elevations "E" (FIG. 2). Those skilled in the art would be aware that a bed "F" preferably is prepared substantially at the design elevation "E", to receive the pipeline "Q", before the system 20 is brought along the predetermined path "P".

As can be seen in FIGS. 1-3B, 3D-3F, 4, and 5, the bed "F" may be formed in a trench "T". However, depending on factors such as ground conditions or the design elevation relative to the local topography, the bed "F" may be required to be at least partly above a ground surface. In this case, the bed "F": preferably is defined by structures "S" built on a ground surface "GS", as illustrated in FIG. 6.

Whether the bed "F" is positioned below ground surface "GS" (i.e., in the trench "T", as illustrated in FIG. 2) or on the structure "S" above the ground surface "GS" (i.e., as illustrated in FIG. 6), the finished pipe segments 39 preferably are lowered from the finishing module 38 to the bed "F", under the influence of gravity. Because the finished pipe segments 39 are substantially stationary, except for vertical movement thereof relative to the design elevation "E", the movement of the straight pipe processing subassembly 26 and the finishing subassembly 34 in the upstream direction results in the finished pipe segments 39 being lowered to the bed "F" gradually, as such movement in the upstream direction takes place. In practice, this means that, when the support provided by the finishing module 38 is removed (i.e., due to the movement thereof in the upstream direction), the finished pipe segments 39 move downwardly toward the bed "F", under the influence of gravity.

In one embodiment, the system 20 preferably includes an apron element 41 for supporting the finished pipe segments 39 after the support provided by the finishing module 38 is removed, due to movement of the finishing module 38 and the other modules connected thereto (directly or indirectly) in the upstream direction. Preferably, the apron element 41 is connected to the finishing module 38, substantially at its downstream side (FIG. 2). The apron element 41 preferably is somewhat flexible, and may be hinged at its upper end, i.e., at or near its connection with the downstream side of the finishing module 38.

Those skilled in the art would appreciate that, after the pipeline "Q" is laid in the trench "T", the trench may be backfilled.

The system 20 additionally includes a first propelling device 42, for moving the straight pipe processing subassembly 26 and the finishing subassembly 34 along the predetermined path "P". In one embodiment, the first propelling device 42 preferably is mounted in a transportation module 43 that is attached to the loader module 28. It is also preferred that the system 20 also includes a second propelling device 44, for moving the second fusing module 40 relative to the finishing subassembly 34, to attach the second fusing module 40 to the inspection module 36. As can be seen in FIG. 3F, in one embodiment, the second propelling device 44 preferably is mounted in the second fusing module 40. (It will be understood that the first and second propelling devices 42, 44 are omitted from all the drawings except FIGS. 1 and 3F for clarity of illustration.)

Those skilled in the art would appreciate that the propelling devices 42, 44 may be provided in any suitable configuration. For example, as illustrated, the propelling devices 42, 44 include wheels "W" for engaging the surface "GS" of the ground, to move the modules in which the propelling devices 42, 44 are respectively mounted relative to the ground surface "GS". Those skilled in the art would be aware of other means for engaging the ground surface "GS", other than wheels (e.g., caterpillar tracks). Those skilled in the art would also be aware of suitable motive means (not shown) for rotating the wheels "W", e.g., a motor and a drive train.

The modules 43, 28, 30, 36, 38, and 40 may be connected together as required, and detached as required, by any suitable linkage "L" (FIG. 2). Those skilled in the art would be aware of suitable linkages "L".

Figure 3B:
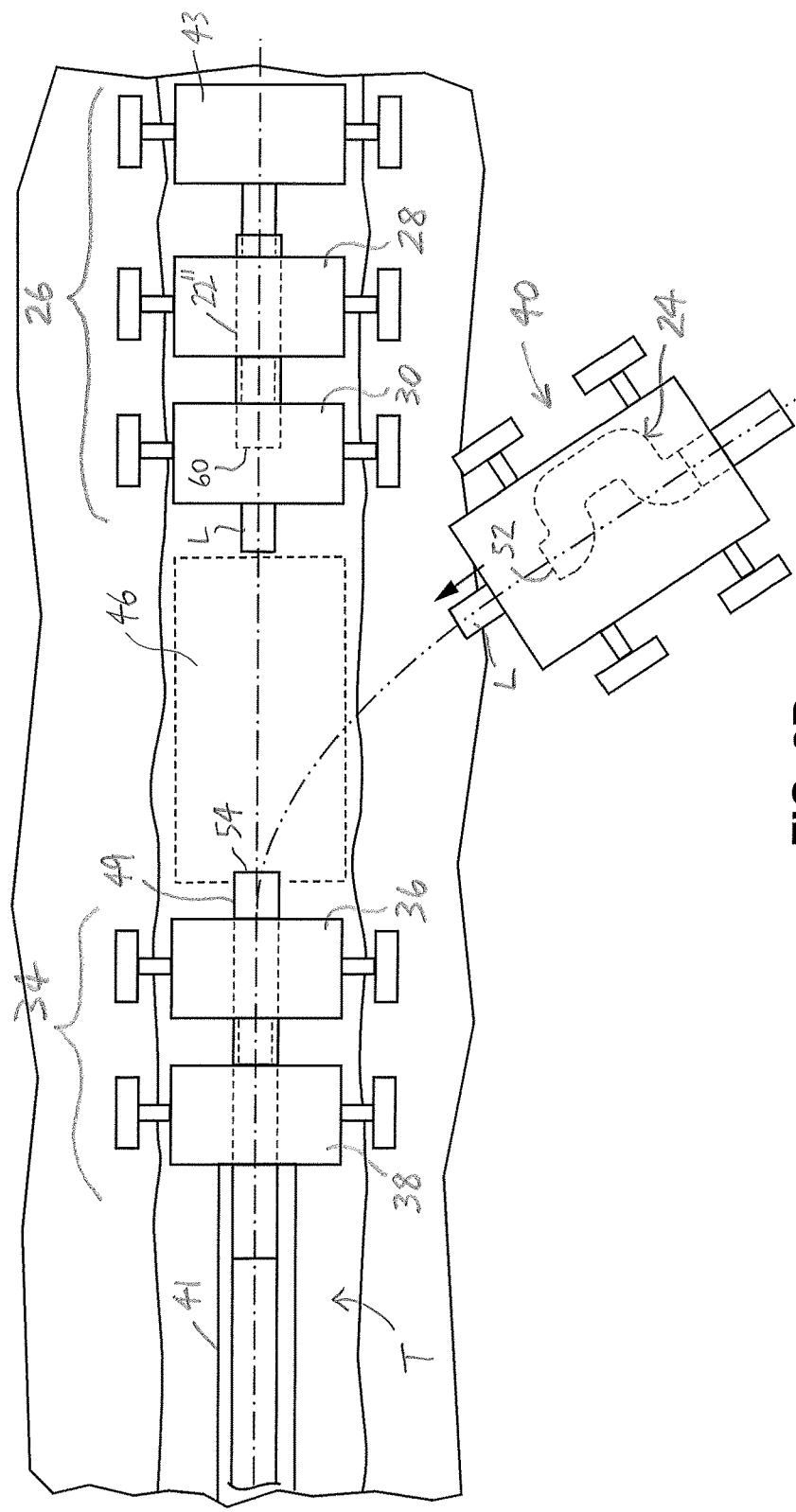
FIG. 3B is a top view of the system of FIG. 3A additionally including a second fusing module, positioned for insertion between the straight pipe processing subassembly and the finishing subassembly.
Figure 3C:
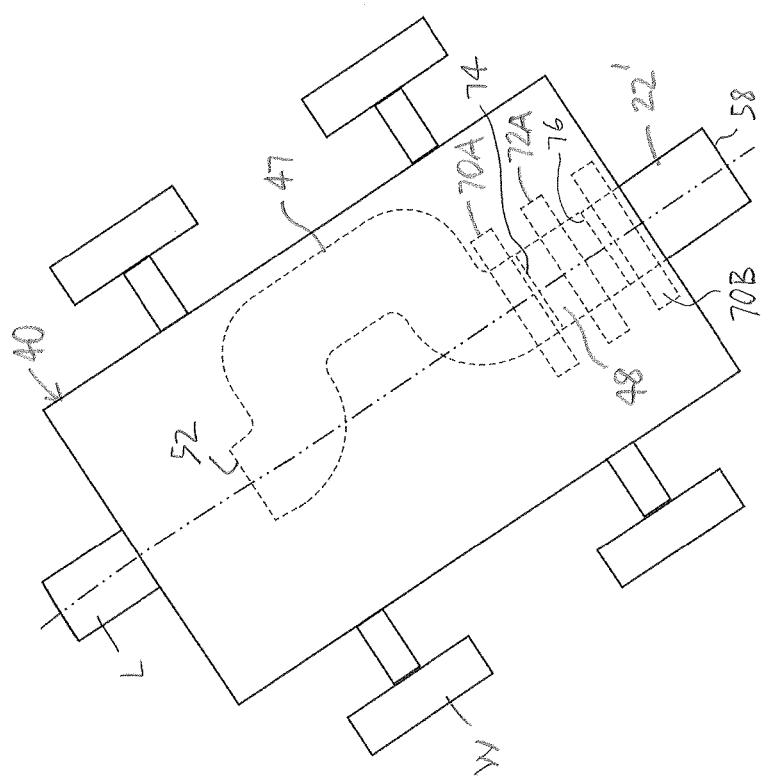
FIG. 3C is a top view of the second fusing module showing an embodiment of a non-linear pipe subassembly positioned therein, drawn at a larger scale.
Figure 3D:
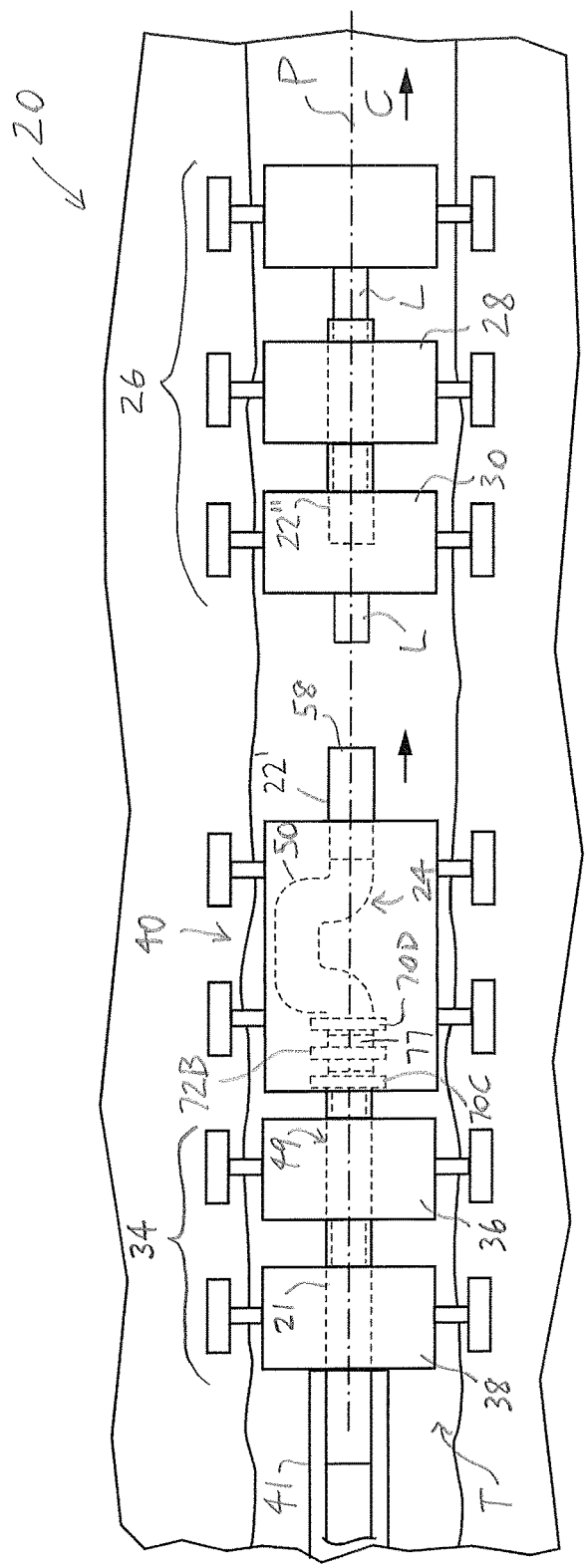
FIG. 3D is a top view of an embodiment of the system of the invention in which the second fusing module is inserted between the straight pipe processing subassembly and the finishing subassembly, drawn at a smaller scale.
Figure 3E:
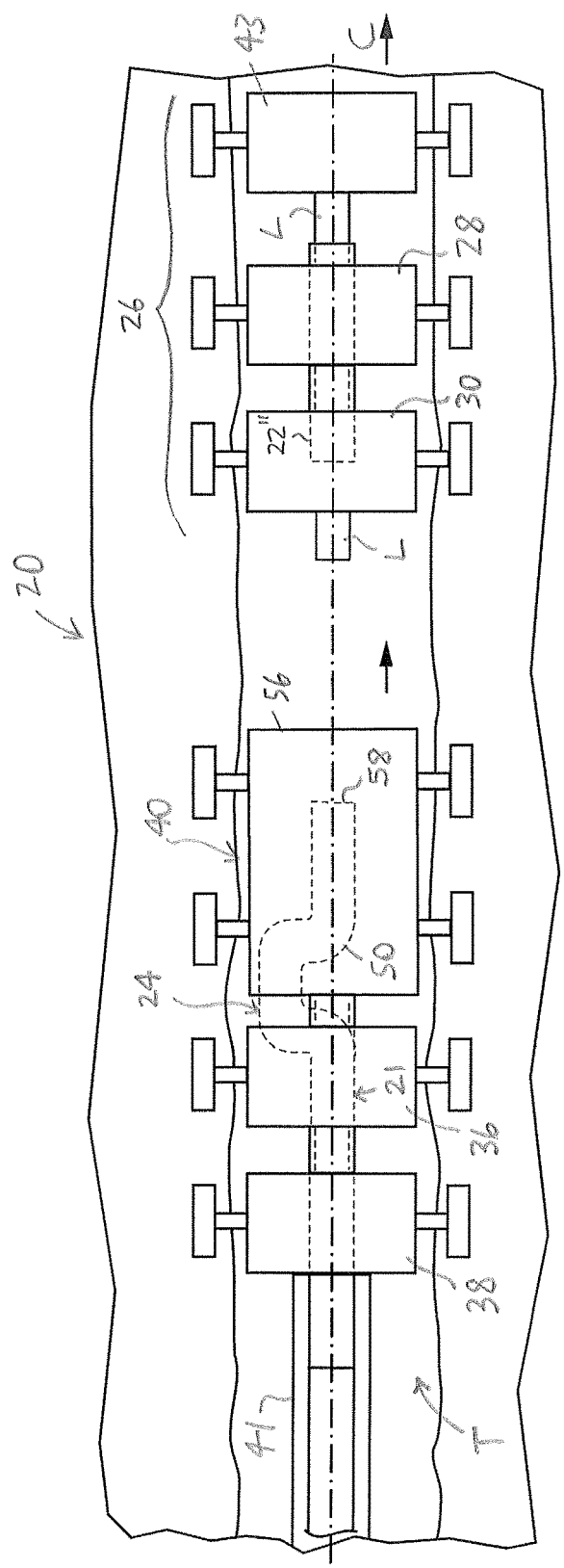
FIG. 3E is a top view of the system of FIG. 3D in which the non-linear pipe subassembly is included in fused pipe.
Figure 3F:
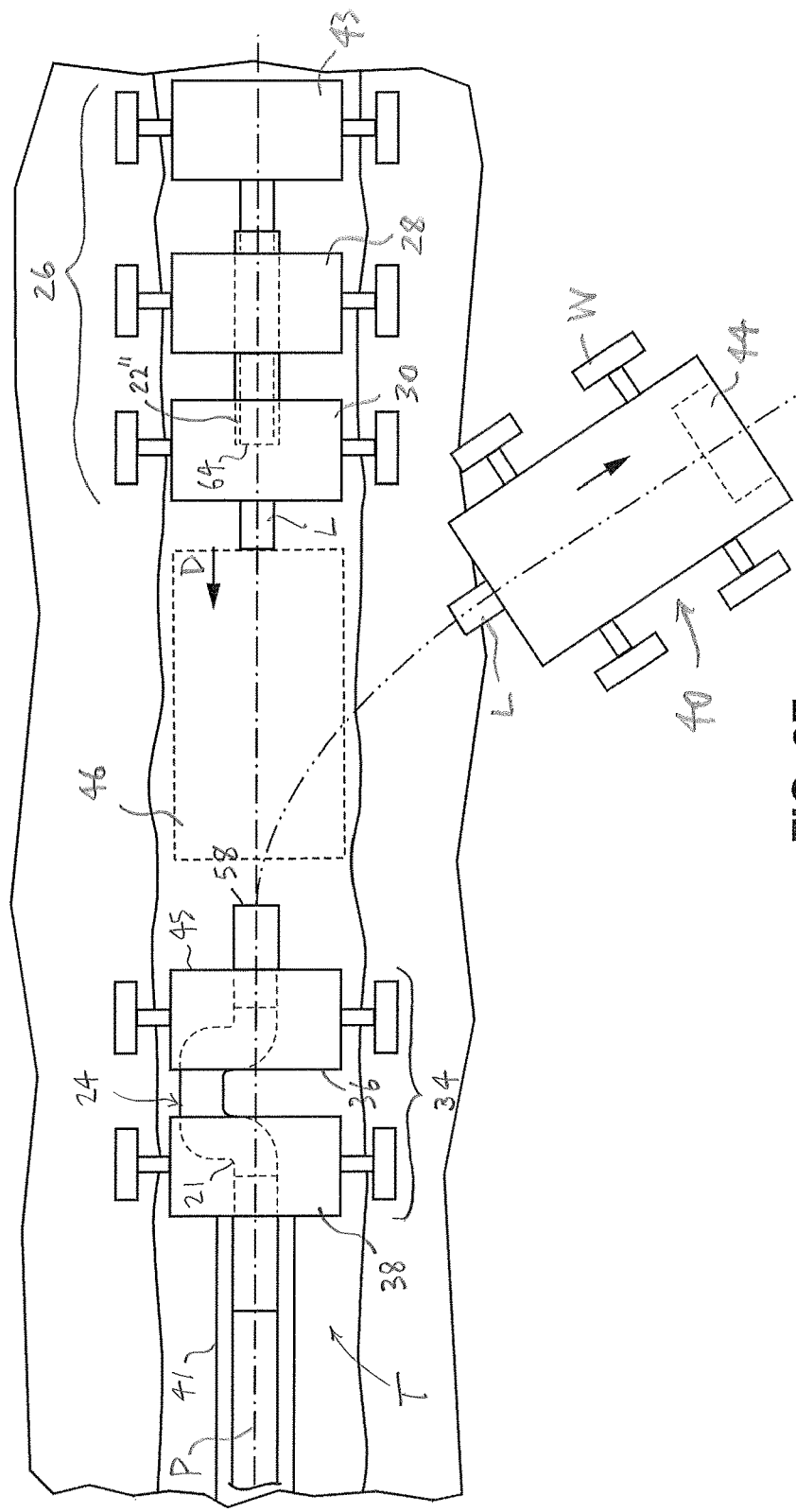
FIG. 3F is a top view of the system in which the second fusing module is detached from the straight pipe processing subassembly and the finishing subassembly.

As can be seen in FIGS. 3B and 3F, in one embodiment, the system 20 preferably also includes a platform 46 positionable to support the second fusing module 40 when it is moved into a predetermined position between the straight pipe processing subassembly 26 and the finishing subassembly 34 (FIGS. 3D, 3E) for attachment to the inspection module 36. As will be described, when the second fusing module 40 is in the predetermined position, the non-linear pipe subassembly 24 can be fused to the (generally straight) fused pipe 21.

As illustrated in FIG. 3B, in one embodiment, the platform or support element 46 preferably is positioned in or over the trench "T", to support the second fusing module 40 when it is moved into, and out of, the predetermined position thereof, between the straight pipe processing subassembly 26 and the finishing subassembly 34 (FIGS. 3B, 3F). Those skilled in the art would be aware of suitable platforms or support elements 46.

Those skilled in the art would also be aware that, where the design elevation is at or above the ground surface elevation, the platform or support element 46 may not be needed.

Figure 3G:
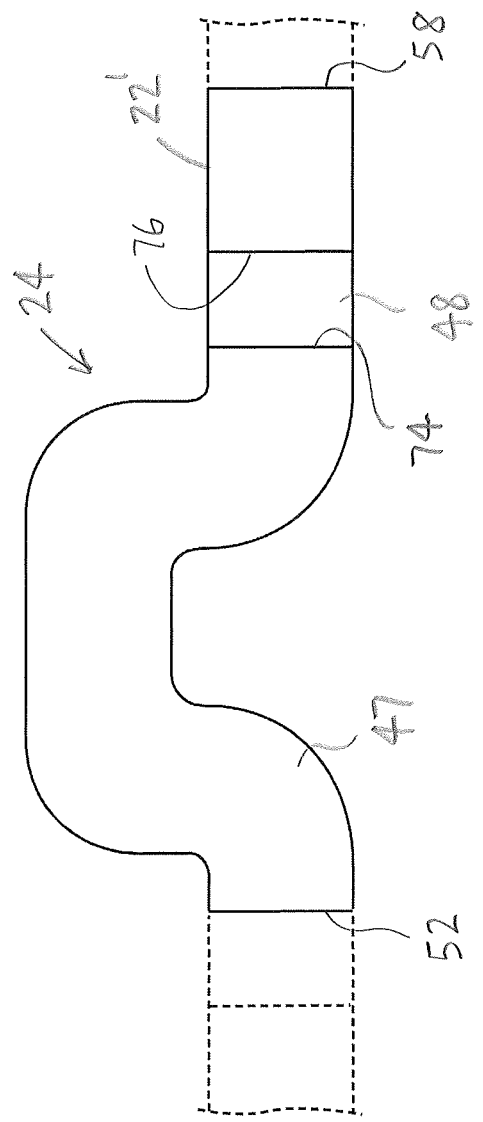
FIG. 3G is a top view of the non-linear pipe subassembly, drawn at a larger scale.
Figure 3H:
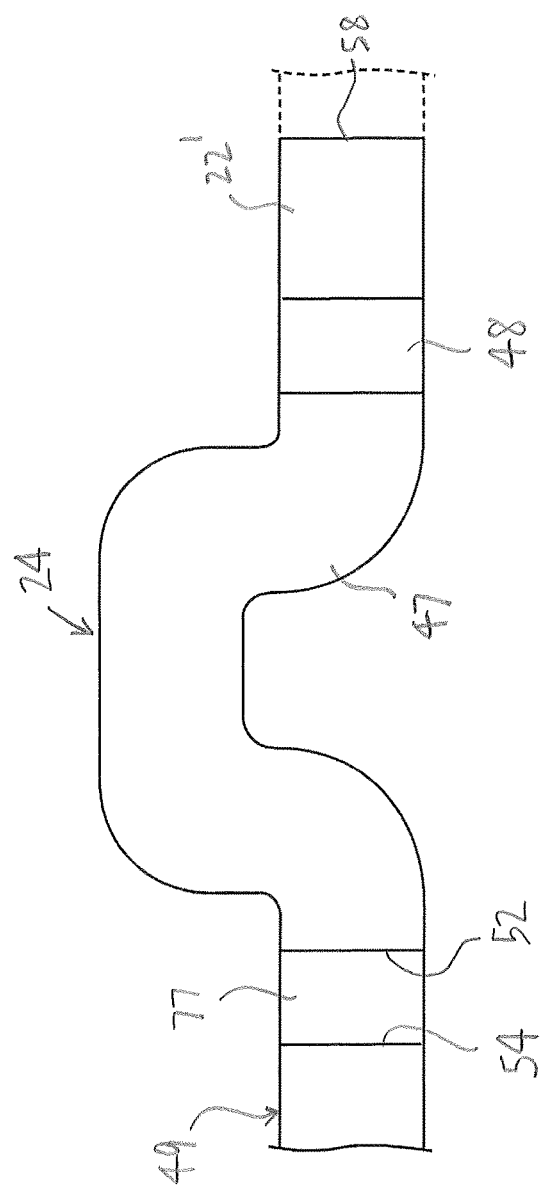
FIG. 3H is a top view of the non-linear pipe subassembly of FIG. 3G, with straight pipe elements fused thereto.
Figure 3I:
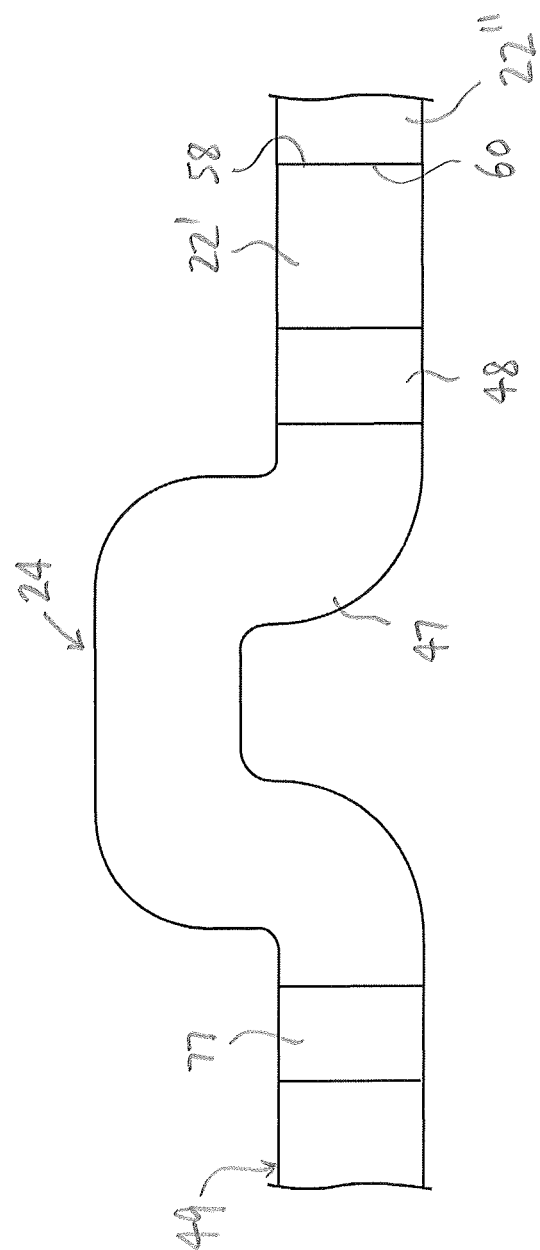
FIG. 3I is a top view of the non-linear pipe subassembly of FIG. 3H, with an additional straight pipe element fused thereto.

As can be seen in FIGS. 3G-3I, in one embodiment, the non-linear pipe subassembly 24 preferably includes a non-linear pipe segment 47 and a selected straight pipe element 22' that are secured to each other via a first intermediate pipe element 48. The manner in which the non-linear pipe element 47 and the straight pipe element 22' are secured to each other via the first intermediate pipe element 48 will be described further below.

Those skilled in the art would appreciate that the straight pipe elements 22 may be fused together in the first fusing module 30 using any suitable method. For example, the methods disclosed in U.S. Pat. No. 6,637,642 (Lingnau) or U.S. Pat. No. 7,348,523 (Slack et al.) may be suitable for fusing the straight pipe elements 22 together. As described in the '642 and '523 patents, the methods disclosed therein require that two straight pipes that are to be welded together are rotated and heated before they are engaged together, end-to-end, to fuse the two straight pipes together.

Those skilled in the art would also appreciate that fusing the non-linear pipe subassembly 24 to the fused straight pipe segments 32 and to the straight pipe elements 22 requires the implementation of techniques other than those disclosed in the '642 and the '523 patents, because it is not practical to rotate the non-linear subassembly 24 about a longitudinal axis of the ends thereof. The non-linear pipe subassembly 24 may be fused to the straight pipe elements 22 using any suitable method, or methods. For example, the non-linear pipe subassembly 24 may be fused to the straight pipe elements 22 using the method disclosed in U.S. patent application Ser. No. 14/220,508, filed on Mar. 20, 2014 (to be granted as U.S. Pat. No. 9,644,769) (the "Cheng patent"), the entirety of which patent application is hereby incorporated herein by reference. As disclosed in the Cheng patent, an intermediate tubular workpiece positioned between two workpieces is rotated about its axis, heated, and engaged with the two workpieces to cause plastic deformation therein, for bonding the intermediate tubular workpiece with the adjacent workpieces.

Those skilled in the art would appreciate that the straight pipe element 22' may be fused to the non-linear pipe element 47 (i.e., directly, or indirectly, as the case may be) using any suitable method. As can be seen in FIG. 3G, it is preferred that the straight pipe element 22' is attached to the non-linear pipe element 47 indirectly, i.e., via the first intermediate pipe element 48, as described in the Cheng patent. As will be described, this arrangement will make connecting with the next upstream straight pipe element easier, because (once the straight pipe element 22' is attached) the straight pipe element 22' is positionable for fusing to the selected one 22" of the straight pipe elements.

In an embodiment of a method of the invention, the pipeline "Q" including the fused pipe 21 preferably is laid in the upstream direction along the predetermined path "P", as described above. It is preferred that the method includes providing the loader module 28 for loading the straight pipe elements 22, positioning a number of the straight pipe elements 22 in the loader module 28, and providing the first fusing module 30 connected to the loader module 28 and configured for fusing the straight pipe elements 22 together. With the first fusing module 40, the straight pipe elements 22 preferably are fused together in series (i.e., end-to-end) to form a first portion 49 of the fused pipe 21 (FIG. 1).

The method also includes the step of, in the inspection module 36 (when attached to the first fusing module 30), inspecting the fused pipe 21. Also, in the finishing module 38 attached to the inspection module, coating is applied to the fused pipe, to form the finished pipe segments 39. It is also preferred that the straight pipe processing subassembly 26 and the finishing subassembly 34 are moved relative to the predetermined path "P" in the upstream direction (indicated by arrow "C") along the predetermined path "P", to allow the finished pipe segments 39 to be lowered to the design elevation(s) along the predetermined path "P" under the influence of gravity. Those skilled in the art would appreciate that, in accordance with the foregoing, the finished pipe segments 39 including straight pipe segments 22 are laid along the predetermined path "P".

As noted above, one or more non-linear pipe subassemblies 24 preferably are included in the pipeline "Q", at the preselected location "A". Accordingly, in one embodiment, the method includes detaching the first fusing module 30 from the inspection module 36, substantially at the preselected location "A". Preferably, the straight pipe processing subassembly 26 is moved in the upstream direction apart from the finishing subassembly 34, to provide a gap "G" between the first fusing module 30 and the inspection module 36 substantially at the preselected location "A" (FIGS. 3A, 3B).

The gap "G" preferably is sufficiently large to permit the second fusing module 40 to be connected to the inspection module 36, at an upstream side 45 of the inspection module 36 (FIG. 3A). After the straight pipe processing subassembly 26 and the finishing subassembly 34 are positioned so that they are separated by the gap "G", the second fusing module 40 is moved into a predetermined position (illustrated in FIGS. 3D and 3E), in which the second fusing module 40 is connected to the inspection module 36 by the linkage "L" on the second fusing module 40, so that the second fusing module 40 is located immediately upstream relative to the inspection module 36. It will be understood that the second fusing module 40 moves the finishing subassembly 34 in the upstream direction, as the non-linear pipe subassembly 24 is fused at its downstream end to the fused straight pipe, and the pipeline is laid. While the second fusing module 40 is connected with the inspection module 36, the straight pipe processing subassembly 26 preferably is also moved in the upstream direction, to the extent that such movement is needed in order to maintain the gap "G" between the straight pipe processing subassembly 26 and the finishing subassembly 34.

It is also preferred that one or more support elements 46 are positioned in the gap "G" (FIGS. 3B, 3F). The second fusing module 40 preferably is moved into the gap "G" relative to the inspection module 36, and the second fusing module 40 is attached with the inspection module 36 (FIG. 3D), so that the second fusing module 40 is located in the predetermined position thereof. Those skilled in the art would appreciate that the second fusing module 40 preferably is at least partially supported by the support element 46 as the second fusing module 40 is moved into the gap "G", because such movement requires the second fusing module 40 to cross over the predetermined path "P".

As can be seen in FIG. 3A, the gap "G" is created by decoupling the inspecting module 36 and the first fusing module 30 from each other, and then moving the straight pipe processing subassembly 26 a short distance in the upstream direction. After the second fusing module 40 is moved into its predetermined position and attached to the inspection module 36 via the linkage "L", the straight pipe processing subassembly 26 is moved in the upstream direction when the finishing subassembly 34 and the second fusing module 40 are moved in that direction, to maintain the gap "G".

As noted above, the straight pipe elements 22 preferably are fused together using any suitable method. Also, the non-linear pipe element 47 is fused to the straight pipe elements (preferably, indirectly, via an intermediate pipe element) using any suitable method. However, and as is also noted above, the non-linear pipe element 47 preferably is indirectly secured to the straight pipe elements by intermediate pipe elements, using the methods disclosed in the Cheng patent. As described in the Cheng patent, the method involves clamps that are used to hold two workpieces stationary and a further engagement element, for rotating the intermediate pipe element that is positioned between the two workpieces. The method of the Cheng patent preferably also involves positioning heating elements between the workpieces, prior to engagement of the workpieces together with a sufficient forging force. It will be understood that the heating elements are omitted from the drawings herein for clarity of illustration.

The result of the preferred method of fusing an upstream end 74 of the non-linear pipe element 47 and the first intermediate pipe element 48, and also of fusing the first intermediate pipe element 48 to a downstream end 76 of the straight pipe element 22', can be seen in FIG. 3G. The devices used to achieve the results illustrated in FIG. 3G are schematically illustrated in FIG. 3C. Preferably, a clamp 70A engages the non-linear pipe segment 47 near its upstream end 74, and another clamp 70B engages the straight pipe element 22' near its downstream end 76. In accordance with the method disclosed in the Cheng patent, the clamp 72A engages the first intermediate pipe element 48, to rotate it, for fusing it to the non-linear pipe element 47 and the straight pipe element 22', to form the non-linear pipe subassembly 24.

It will be understood that certain other elements (e.g., heating elements) used in the method described in the Cheng patent are omitted from FIG. 3C, for clarity of illustration. It will also be understood that the clamps and engagement elements are generally omitted from the drawings for clarity of illustration, except as specifically referred to herein.

As described above, once the non-linear pipe subassembly 24 is positioned in alignment with the first portion 49 of the fused pipe 21 (FIGS. 3B, 3D), the downstream end 52 of the non-linear pipe subassembly 24 preferably is fused to the upstream end 54 of the first portion 49 of the fused pipe 21. As can be seen in FIG. 3D, it is preferred that the method of fusing the first portion 49 and the non-linear pipe subassembly 24 is that described in the Cheng patent.

Accordingly, to secure the non-linear pipe subassembly 24 at its downstream end to the straight pipe already fused, the first portion 49 is held stationary by a clamp 70C, and the non-linear pipe subassembly 24 is held stationary by a claim 70D. A second intermediate pipe element 77, positioned between the first portion 49 and the non-linear pipe subassembly 24, is held and rotated by another clamp 72B (FIG. 3D).

In one embodiment, the method of the invention preferably includes fusing a downstream end 52 of the non-linear pipe subassembly 24 located in the second fusing module to an upstream end 54 of the first portion 49 of the fused pipe 21 supported by the inspection module 36 (FIG. 3B), to provide the second portion 50 of the fused pipe 21 that includes the non-linear pipe subassembly 24 (FIGS. 3D, 3E). The fusing may be accomplished using any suitable method. As can be seen in FIG. 3D, at this point, the non-linear pipe subassembly 24 is fused to the straight pipe segments 32 that are located downstream from the non-linear pipe subassembly 24, i.e., to the fused pipe 21 that is straight pipe and positioned downstream from the non-linear pipe subassembly 24.

The second fusing module 40 preferably is then moved in the upstream direction, along with the other modules 36 and 38, to position the non-linear pipe subassembly 24 at least partially in the inspection module 36, in which the second portion 50 of the fused pipe 21, including the non-linear pipe subassembly 24, is inspected (FIG. 3F). At the same time, the straight pipe processing subassembly 26 preferably is also moved in the upstream direction, to maintain the gap "G" between the straight pipe processing subassembly 26 and the finishing subassembly 36. As noted above, for the purposes hereof, the inspection of the fused pipe may include post-weld treatment, as well as inspection. Next, the second fusing module 40 is moved in the upstream direction to position the non-linear pipe subassembly 24 at least partially in the finishing module 38, in which coating is applied to the non-linear pipe subassembly 24, to include the non-linear pipe subassembly 24 in the finished pipe segments 39. This is also shown, in part, in FIG. 3F. In addition, and also as noted above, the process of adding coating to the part of the fused pipe 21 that includes the non-linear pipe subassembly 24 may also include adding insulation thereto, in the finishing module 38.

It will be understood that, at this point, the movement of the second fusing module 40 in the upstream direction is controlled so that such movement stops when the fused pipe 21 (i.e., including the non-linear pipe subassembly 24) is positioned in the finishing subassembly 34 so that the upstream end 58 of the straight pipe segment 22' is in a preselected position relative to an upstream side 45 of the inspection module 36 (FIG. 3F). As can be seen in FIG. 3F, the positioning of the fused pipe 21 at this point (i.e., with the upstream end 58 somewhat upstream relative to the upstream side 45) is intended to locate the upstream end 58 of the straight pipe element 22' so that another straight pipe element may be fused to it at the upstream end 58 subsequently.

Preferably, once the straight pipe element 22' is in the preselected position, the second fusing module 40 is then detached from the inspection module 36 (FIG. 3F). It is also preferred that the second fusing module 40 is then moved away from the predetermined path "P", thereby opening the gap "G" again between the straight pipe processing subassembly 26 and the finishing subassembly 34, as illustrated in FIG. 3F.

Preferably, the platform 46 is then removed from the trench "T". Subsequently, the straight pipe processing subassembly 26 is moved in a downstream direction opposite to the upstream direction (indicated by arrow "D" in FIG. 3F) so that the first fusing module 30 and the inspection module 36 are attached together, using the linkage "L" mounted on the first fusing module 30.

As can be seen in FIGS. 3F and 4, once the first fusing module 30 and the inspection module 36 are attached together, the upstream end 58 of the straight pipe element 22' is positioned for engagement thereof to a downstream end 64 of a straight pipe element 22" (FIG. 3F). As can be seen in FIG. 4, once the first fusing module 30 and the inspection module 36 are coupled together, to continue the process of forming the fused pipe 21, the upstream end 58 and the downstream end 64 are fused together. The fusing may be accomplished using any suitable method. For example, the pipe element 22" may be heated and rotated and then engaged with the upstream end of the straight pipe element 22', in accordance with the method of the '642 patent or the method of the '523 patent. (It will be understood that the clamps that may be required are illustrated in FIGS. 3D and 3E and omitted from FIGS. 3F and 4, for clarity of illustration.)

It will be understood that the process of forming the fused pipe 21 may be continued thereafter, by loading straight pipe segments 22 into the loading module 28 and fusing them (in the first fusing module 30) with the previously fused pipe 21 as the straight pipe subassembly 26 and the finishing subassembly 34 removed in the upstream direction. The straight pipe processing subassembly 26 and the finishing subassembly 34, being coupled together (FIG. 4), are moved in the upstream direction along the predetermined path "P", to allow the finished pipe segments 39 including the non-linear pipe subassembly 24 to be positioned at the preselected location "A" on the predetermined path "P".

In this way, the non-linear subassembly 24 is also secured to the straight pipe elements located upstream therefrom, e.g., utilizing a method such as one of those disclosed in the '642 patent and the '523 patent, described above. Those skilled in the art would appreciate that any suitable method may be used. The elements required preferably are located on the first fusing module 30, and are omitted from the drawings for clarity of illustration.

From the foregoing, it can be seen that, in one embodiment, the non-linear pipe subassembly 24 of the invention preferably extends between first and second ends 52, 58 thereof (FIG. 3G). The non-linear pipe subassembly 24 preferably includes the non-linear pipe element 47, extending between upstream and downstream ends 74, 52 thereof, and the straight pipe element 22' extending between upstream and downstream ends 58, 76 thereof. As can also be seen in FIG. 3G, the non-linear pipe subassembly 24 preferably also includes an intermediate pipe element 48 positioned between the straight pipe element 22' and the upstream end 74 of the non-linear pipe element 47. The intermediate pipe element 48 preferably is fused to the non-linear pipe element 47 at its upstream end 74 and fused to the straight pipe element 22' at its downstream end 76.

As noted above, the non-linear pipe subassembly 24 preferably is first fused to the previously formed fused pipe at the downstream end 52 thereof. This is also illustrated in FIGS. 3D and 3E. In FIG. 3H, the result of this process is illustrated at a larger scale. As can be seen in FIG. 3H, non-linear pipe subassembly 24 preferably is joined with the first portion 49 of the fused pipe 21 via the second intermediate pipe element 77, i.e., preferably utilizing the method disclosed in the Cheng patent. As described above, the second intermediate pipe element 77 is positioned between the upstream end 54 of the first portion of the fused pipe 21 and the downstream end 52 of the non-linear pipe subassembly 24.

Similarly, and also as described above, the straight pipe element 22' that is included in the non-linear pipe subassembly 24 is secured to the next straight pipe element 22" that is immediately upstream relative thereto (FIG. 4). As described above, the non-linear pipe subassembly 24 preferably is fused, at its upstream end 58, to the selected one 22" of the straight pipe elements at its downstream end 64.

It will be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

I claim:

1. A method of forming a pipeline comprising fused pipe laid in an upstream direction along a predetermined path having at least one design elevation, the pipeline comprising straight pipe elements and at least one non-linear pipe subassembly positioned at a preselected location on the predetermined path, the method comprising:
    (a) providing a loader module for loading the straight pipe elements;
    (b) positioning a plurality of the straight pipe elements in the loader module;
    (c) providing a first fusing module connected to the loader module and configured for fusing the straight pipe elements together, the loader module and the first fusing module comprising a straight pipe processing subassembly;
    (d) with the first fusing module, fusing the straight pipe elements together in series to form a first portion of the fused pipe;
    (e) in an inspection module attached to the first fusing module, inspecting the fused pipe;
    (f) in a finishing module attached to the inspection module, applying coating to the fused pipe, to form finished pipe segments, the inspection module and the finishing module comprising a finishing subassembly;
    (g) moving the straight pipe processing subassembly and the finishing subassembly relative to the predetermined path in the upstream direction along the predetermined path to allow the finished pipe segments to be lowered to said at least one design elevation along the predetermined path under the influence of gravity;
    (h) substantially at the preselected location, detaching the first fusing module from the inspection module;
    (i) moving the straight pipe processing subassembly in the upstream direction apart from the finishing subassembly, to provide a gap between the first fusing module and the inspection module substantially at the preselected location;
    (j) positioning at least one support element in the gap;
    (k) moving a second fusing module into a predetermined position in the gap relative to the inspection module, and attaching the second fusing module with the inspection module, the second fusing module being at least partially supported by said at least one support element;
    (l) fusing a downstream end of said at least one non-linear pipe subassembly located in the second fusing module to an upstream end of the first portion of the fused pipe supported by the inspection module, to provide a second portion of the fused pipe that comprises said at least one non-linear pipe subassembly;
    (m) moving the second fusing module in the upstream direction to position said at least one non-linear pipe subassembly at least partially in the inspection module, in which the second portion of the fused pipe, comprising said at least one non-linear pipe subassembly, is inspected;
    (n) moving the second fusing module in the upstream direction to position said at least one non-linear pipe subassembly at least partially in the finishing module, in which a coating is applied to said at least one non-linear pipe subassembly, to include said at least one non-linear pipe subassembly in the finished pipe segments;
    (o) detaching the second fusing module from the inspection module;
    (p) moving the second fusing module away from the predetermined path;
    (q) attaching the first fusing module to the inspection module;
    (r) fusing a downstream end of a selected one of the straight pipe elements with the upstream end of said at least one non-linear pipe subassembly to include said at least one non-linear pipe subassembly in the fused pipe;
    (s) moving the straight pipe processing subassembly and the finishing subassembly in the upstream direction along the predetermined path, to allow the finished pipe segment including said at least one non-linear pipe subassembly to be positioned in the preselected location on the predetermined path.

2. The pipeline formed according to the method of claim 1.

* * * * *